United States Patent Office 2,960,269
Patented Nov. 15, 1960

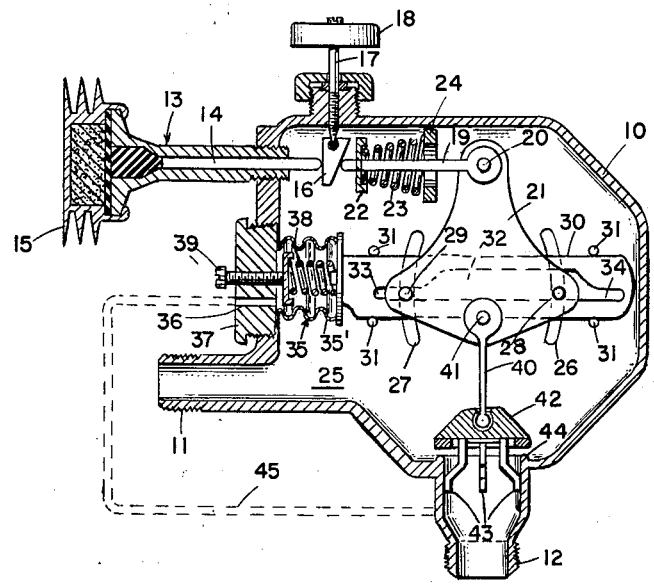

2,960,269
VALVE STRUCTURE

William L. McGrath, Syracuse, N.Y., assignor to Carrier Corporation, Syracuse, N.Y., a corporation of Delaware Filed Apr. 22, 1957, Ser. No. 654,094

3 Claims. (Cl. 236—1)

This invention relates to valve structures and more particularly to a valve structure which is designed for use in air conditioning systems to automatically effect a changeover from summer to winter operating conditions, or vice versa.

In Carrier Patents Nos. 2,363,294 and 2,363,945 granted November 21, 1944, and November 28, 1944, respectively, there is disclosed an air conditioning system in which a volume of air is conditioned to a desired degree at a central conditioning point and is then distributed at relatively high static pressure and at relatively high velocity to a plurality of units respectively disposed in and serving a plurality of enclosures to be conditioned. The high pressure air supplied to each unit is discharged therein through nozzle formations or the like and in this manner induces secondary air from the area to be conditioned into the unit for mixture with the high pressure air. The primary, or conditioned air, and secondary, or induced air, are then supplied to the area to be conditioned. In order to effect sensible heating (in winter) or cooling (in summer) of air circulating through the units as required, heated or cooled water or other fluid is delivered to coils within the various units from a central station. The amount of sensible heating or cooling which is effected depends upon the amount of heating or cooling fluid which is permitted to pass through each unit. The changeover valve is responsive to a thermostat positioned in the room to automatically vary the amount of fluid passing through the unit, as required, regardless of whether the unit is operating under its winter or summer conditions. It is for efficient and foolproof operation under the foregoing circumstances that the valve of the present invention is contemplated.

It is therefore the chief object of this invention to provide a simplified and greatly improved changeover valve structure which is efficient in operation and relatively inexpensive to manufacture.

Another object of this invention is to provide an improved changeover valve structure which is capable of improved operating performance under different seasonal operating conditions. Other objects and attendant advantages of the present invention will readily be perceived hereafter.

The valve structure of the present invention includes a housing having a passage therethrough for either heated or cooled fluid. First means are provided for opening and closing the passage. A plate member is connected to said first means and the plate member is moved by thermostatic means which are responsive to the temperature of the area to be conditioned. Thus the amount of fluid passing through the valve housing is metered in response to the temperature of the area being conditioned. Second means are provided within the valve housing for controlling the movement of the plate member. These second means are responsive to the condition of the fluid within the housing, that is, either temperature, pressure, or direction of flow of the latter, to cause the changeover valve to automatically supply more cool fluid to the unit during summer when the thermostat senses a high room temperature and vice versa, and also provide less hot fluid to the unit during winter when the thermostat senses a too high temperature and vice versa. The present invention will be more fully understood when the following portions of the specification are read in conjunction with the accompanying drawings wherein the drawing is a view partly in section of an improved valve in accordance with the teachings of my invention shown in its winter operating position with the temperature responsive thermal element calling for no heat and the valve plug in its minimum flow position.

Reference is now made to the drawing, wherein numeral 10 indicates the valve housing. Water connections 11 and 12 are provided for coupling to suitable water carrying conduits (not shown). The flow of fluid through the valve is in through portion 11 and out through 12.

A thermal element 13 is suitably mounted on the housing. This element is responsive to the temperature of the air in the area to be conditioned. Insofar as is pertinent for purposes of this specification, it is only necessary to understand that rod 14 of element 13 is caused to move to the right of the figure in response to an increase in room temperature. Conversely, rod 14 moves to the left of the figure upon a decrease in room temperature. As shown, thermal responsive element 13 may be of the expansible eutectic type, or it may be of any of several other well known types which will perform the above mentioned function satisfactorily. A specific example of element 13 is shown in Patent No. 2,636,776, granted April 28, 1953, or Patent No. 2,368,181, granted January 30, 1945. The temperature sensing end 15 of the thermal responsive element 13 is positioned in the path of the air stream which is being induced into the unit of the above mentioned type.

An adjusting mechanism is provided for the valve structure. This adjusting mechanism consists of a straight line cam 16, which is pivotally connected to threaded spindle 17 having adjusting knob 18 mounted thereon. As can be seen from the drawing, spindle 17 is suitably threaded into housing 10 and the manipulation of knob 18 will cause straight line cam 16 to move in a vertical direction. One end of rod 14 abuts one side of cam 16. A link 19 has one side thereof bearing on the opposite side of cam 16. The other side of link 19 is pinned at 20 to plate member 21, so that there can be relative pivotal movement between the two. A collar 22 is fixedly mounted on link 19, and a compression spring 23 encircles link 19 and extends between collar 22 and support member 24, which is fixedly mounted in the housing 10. It can thus be seen that spring 23 will cause link 19 to abut straight line cam 16.

Formed in the rear wall 25 of the housing 10 are recesses 26 and 27. Similar recesses may be formed in the front wall (not shown) of housing 10. Plate member 21 has pins 28 and 29 integrally attached thereto, one end of each of these pins projecting into the curved recesses 26 and 27, respectively. A slider plate 30, which is adapted for reciprocating horizontal motion, as explained hereafter, lies between plate 21 and the back wall 25 of the housing 10. The path of horizontal movement of slidable plate 30 is determined by pins 31, which are affixed to wall 25. Slidable plate 30 has a central cutout portion 32, which merges into opposed elongated slots 33 and 34, these slots being of slightly larger dimensions than the diameters of pins 28 and 29. Slidable plate 30 is actuated by bellows assembly 35. The inside of bellows assembly 35 is vented to the atmosphere through vent 36 and cover member 37. A spring 38, which abuts the free end of bellows assembly 35 and is abutted at its other end by adjusting screw mechanism 39, determines the position of bellows assembly 35. In operation of the valve the bellows assembly 35 assumes a position which is determined by the fluid pressure within the valve housing. Thus, the changeover function of the valve is determined by the water pressure within the system as explained in detail hereafter, this having been set forth in my previous patent, No. 2,517,498, issued August 1, 1950.

A link 40 is pivotally connected as at 41 to plate member 21. The other end of link 40 forms a ball and socket connection with valve plug 42. Valve guides 43 are affixed to valve plug 42 to guide the latter in a rectilinear path relative to valve seat 44.

The structure illustrated in the drawing operates in the following manner: When the system is being used for heating such as in winter time, that is, when hot water is being supplied to the valve, it is under a relatively low pressure. This being the case, bellows assembly 35 will be in an expanded position as shown in the figure. Consequently slider member 30 has been pushed to the right so that slot 33 thereof traps pin 29, as shown. However, as can be seen from the drawing, pin 28 of plate member 21 is free to move within the central enlarged slot 32 of slider member 30. Thus upon an increase in temperature of the area being conditioned, rod 14 will move right, causing plate member 21 to pivot in a clockwise direction about pin 29. This, in turn, moves link 40 downwardly to cause valve plug 42 to approach valve seat 44, thus lessening the amount of hot fluid entering the valve housing. In the position illustrated in the figure, rod 14 has reached its farthermost position to the right indicating that the area being conditioned does not require more than a minimum of additional heating. Consequently, valve plug 42 is in its maximum closed position and allows only a minimum of hot water to circulate in the system. In an analogous manner, a decrease in temperature of the area being conditioned will cause rod 14 to move left so that valve plug 42 tends to move away from valve seat 44 to cause more hot fluid to enter the valve housing.

When the valve is being used under summer operating conditions the cold water being supplied thereto is under a relatively high pressure so that bellows assembly 35 will be in a contracted condition. This being the case, slidable member 30 will be pulled to the left so that pin 28 of plate member 21 will become lodged in slot 34. By the same token, pin 29 of plate member 21 will now lie within central enlarged portion 32 of slidable member 30. Thus, upon an increase in temperature of the area being conditioned, rod 14 will move to the right. This in turn will cause plate member 21 to pivot in a clockwise direction about its pivot point 28, which in turn will cause link 40 to move upwardly to move valve plug 42 away from valve seat 44, thus permitting more cool fluid to pass through the valve. In an analogous manner, the sensing of a lower temperature by element 13 will cause less cool fluid to pass through valve housing 10.

Because of the foregoing construction, it can readily be seen that an increase in temperature during winter operating conditions will decrease the amount of hot fluid passing through the valve whereas an increase in temperature of the area being conditioned when the valve is operating under summer conditions will increase the amount of cool fluid passing through the valve.

As noted above, the bellows assembly 35 responds to a change in static pressure to effect changeover from summer to winter operating conditions. However, it is quite apparent that other means may be used for effecting the changeover. For example, bellows 35' may be filled with a volatile liquid, such as ether, or it may be filled with any other suitable solid or liquid fill so that it is responsive to the temperature of the water within the valve. It is also to be noted that the valve may be responsive to a change in direction of flow of the fluid passing therethrough. In this respect the vent 36 may be connected to the portion 12 of the valve by conduit 45. Under this condition, when the flow is into connection 11 and out at connection 12, a high differential pressure is imposed on bellows 19 in one direction, whereas when the flow is reversed, the pressure within the bellows is higher than the pressure on the outside of the bellows, these differential pressures determining the position of bellows assembly 35.

While I have described preferred embodiments of my invention, I desire it to be understood that the invention is not limited thereto, since it may be otherwise embodied within the scope of the following claims.

I claim:

1. In an automatic changeover valve adapted for use with an air conditioning system, a housing having an inlet port and an outlet port, a valve plug movable with respect to one of said ports to meter the amount of fluid which may pass through said valve, a slidable first member having an elongated wide central cutout portion extending along an axis thereof and terminating in a relatively narrow axially aligned slot at each end, means fixed relative to said housing engaging said first member to limit the motion thereof to reciprocation along its said axis, a sensing element within said housing having one end secured to said housing and the other end secured to said first member, said sensing element being responsive to a condition of the fluid in said housing to move said first member from a first position to a second position, a second member disposed within said housing overlying said first member, first connecting means connecting said second member to said valve plug, a temperature responsive element adapted to sense the temperature of an area external of said housing to be conditioned, second connecting means connecting said temperature responsive element to said second member, a pair of spaced pins secured to said second member, said pins being spaced along the said axis of said first member a distance apart less than the distance between said narrow slots in said first member, said pins having a diameter less than the width of said narrow slots, one of said pins being adapted to enter one of said narrow slots while the other of said pins is located in said wide cutout portion when said first member is in said first position, the other of said pins being adapted to enter the other of said slots while said one pin is located in said wide cutout portion when said first member is in said second position, said pins being located on opposite sides of an axis through the points of connection between said second member and said first and second connecting means, and means fixed relative to said housing and cooperating with said pins to confine the motion of said second member so that an increase in temperature in the area being conditioned tends to cause motion of said second member such that said valve plug tends to be withdrawn away from its associated port when said first member is in said first position and tends to cause said valve plug to move toward its associated port when said second member is in said second position, said valve plug responding in the opposite manner upon a decrease in temperature in the area being conditioned.

2. An automatic changeover valve as defined in claim 1 wherein said housing has a side wall and the fixed means cooperating with said pins to confine the motion of said second member comprises a pair of elongated recesses in said side wall of said housing, said recesses being of a width greater than the diameter of the ends of said pins, and the ends of said pins being disposed in said recesses to confine movement of said second member to the desired mode.

3. An automatic changeover valve as defined in claim 1 wherein said sensing element is located in the valve housing and is responsive to the pressure of fluid in said housing.

References Cited in the file of this patent

UNITED STATES PATENTS

| 2,495,227 | Lum | Jan. 24, 1950 |
| 2,534,251 | Dillman | Dec. 19, 1950 |
| 2,556,479 | McGrath | June 12, 1951 |
| 2,558,937 | Dillman | July 3, 1951 |